United States Patent
Jiang et al.

(10) Patent No.: US 12,270,325 B2
(45) Date of Patent: Apr. 8, 2025

(54) CATALYZED PARTICULATE FILTER

(71) Applicant: BASF MOBILE EMISSIONS CATALYSTS LLC, Iselin, NJ (US)

(72) Inventors: Jun Cong Jiang, Shanghai (CN); Yipeng Sun, Iselin, NJ (US); Aleksei Vjunov, Iselin, NJ (US); Pascaline Tran, Iselin, NJ (US); Attilio Siani, Hanover (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

(21) Appl. No.: 18/245,063

(22) PCT Filed: Sep. 15, 2021

(86) PCT No.: PCT/US2021/050351
§ 371 (c)(1),
(2) Date: Mar. 13, 2023

(87) PCT Pub. No.: WO2022/060756
PCT Pub. Date: Mar. 24, 2022

(65) Prior Publication Data
US 2023/0358155 A1 Nov. 9, 2023

(51) Int. Cl.
*F01N 3/035* (2006.01)
*F01N 3/022* (2006.01)

(52) U.S. Cl.
CPC ........... *F01N 3/035* (2013.01); *F01N 3/0222* (2013.01); *F01N 2370/02* (2013.01); *F01N 2510/0682* (2013.01)

(58) Field of Classification Search
CPC .... B01D 2255/1021; B01D 2255/1023; B01D 2255/1025; B01D 2255/9035; B01D 2255/908; B01D 2255/91; B01D 2255/9205; B01D 2255/9207; B01D 53/945; F01N 2330/06; F01N 2370/02; F01N 2510/0682; F01N 3/021; F01N 3/0222; F01N 3/035; F01N 3/0814; F01N 3/0835; F01N 3/0842; F01N 3/101;
(Continued)

(56) References Cited

U.S. PATENT DOCUMENTS 7,476,417 B2 * 1/2009 Dettling .................. B01J 23/63
427/256
8,968,690 B2 * 3/2015 Nunan ..................... B01J 35/19
422/177

(Continued)

OTHER PUBLICATIONS

International Search Report and Written Opinion for corresponding PCT/US2021/050351 mailed Jan. 20, 2022; 7 pages.
(Continued)

*Primary Examiner* — Jesse S Bogue
(74) *Attorney, Agent, or Firm* — DLA Piper LLP (US)

(57) ABSTRACT

Disclosed herein is a particulate filter, in particular a catalyzed particulate filter, for use in an emission treatment system of an internal combustion engine. Provided are catalyzed particulate filters, emission treatment systems with catalyzed particulate filters, methods for manufacturing catalyzed particulate filters, and methods for controlling emissions in exhaust gas from internal combustion engines with catalyzed particulate filters.

14 Claims, 7 Drawing Sheets

(58) Field of Classification Search
CPC ........ F01N 3/103; F01N 3/2066; Y02T 10/12; B01J 23/40; B01J 23/63; B01J 37/0242; B01J 37/0248
See application file for complete search history.

(56) References Cited

U.S. PATENT DOCUMENTS

| | | | | |
|---|---|---|---|---|
| 8,978,368 | B2* | 3/2015 | Harmsen | B01D 53/9477 |
| | | | | 60/299 |
| 9,242,242 | B2* | 1/2016 | Hilgendorff | B01J 23/58 |
| 9,273,583 | B2* | 3/2016 | Bergeal | B01J 23/40 |
| 10,188,987 | B2* | 1/2019 | Li | B01J 35/30 |
| 10,260,395 | B2* | 4/2019 | Li | F01N 3/208 |
| 10,449,518 | B2* | 10/2019 | Markatou | B01J 23/44 |
| 11,117,098 | B2* | 9/2021 | Li | B01D 53/9418 |
| 11,161,098 | B2* | 11/2021 | Nunan | B01J 23/44 |
| 11,583,834 | B2* | 2/2023 | Cheng | F01N 3/2807 |
| 2009/0217652 | A1* | 9/2009 | Bergeal | F01N 3/2828 |
| | | | | 60/299 |
| 2015/0023853 | A1 | 1/2015 | Wittrock et al. | |
| 2016/0045867 | A1* | 2/2016 | Kearl | B01J 20/02 |
| | | | | 502/65 |
| 2018/0080359 | A1 | 3/2018 | Price et al. | |
| 2018/0111086 | A1* | 4/2018 | Chen | B01D 53/9436 |
| 2018/0111088 | A1* | 4/2018 | Li | B01D 46/24492 |
| 2018/0111089 | A1* | 4/2018 | Li | B01J 35/19 |
| 2020/0108373 | A1 | 4/2020 | Xue et al. | |
| 2021/0213425 | A1* | 7/2021 | Nakashima | B01J 23/44 |
| 2022/0154612 | A1* | 5/2022 | Qi | B01J 37/0201 |

OTHER PUBLICATIONS

International Search Report for PCT Patent Application No. PCT/US2021/050351, Issued on Jan. 20, 2022, 2 pages.

* cited by examiner

CATALYZED PARTICULATE FILTER

CROSS-REFERENCE TO RELATED APPLICATIONS

This application is a U.S. National Phase Application of International Patent Application No. PCT/US2021/050351, filed Sep. 15, 2021, which claims priority to Chinese Patent Application No. PCT/CN2020/115944, filed Sep. 17, 2020, each of which is hereby incorporated by reference herein.

TECHNICAL FIELD

The present invention relates to a catalyzed particulate filter, in particular a catalyzed particulate filter for use in an emission treatment system of an internal combustion engine. Provided are catalyzed particulate filters, emission treatment systems with catalyzed particulate filters, methods for manufacturing catalyzed particulate filters, and methods for controlling emissions in exhaust gas from internal combustion engines with catalyzed particulate filters.

BACKGROUND

The largest portions of most internal combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides (NOx) from excessive combustion temperatures.

Certain internal combustion engines, such as lean-burn engines, diesel engines, natural gas engines, power plants, incinerators, or gasoline engines, tend to produce an exhaust gas with a considerable amount of particulate matter (PM).

Emissions of unburned hydrocarbons, carbon monoxide and nitrogen oxide contaminants continue to be regulated. Catalysts containing platinum group metals (PGMs) are accordingly located in the exhaust gas line of internal combustion engines. Such catalysts promote the oxidation by oxygen in the exhaust gas stream of unburned hydrocarbons and carbon monoxide as well as the reduction of nitrogen oxides to nitrogen. The catalyst is formed by coating the PGMs containing slurry on a substrate uniformly. In another technique, the platinum group metals are coated on the substrate in a zoned manner.

On Dec. 23, 2016, the Ministry of Environmental Protection (MEP) of the People's Republic of China published the final legislation for the China 6 limits and measurement methods for emissions from light-duty vehicles (GB18352.6-2016; hereafter referred to as China 6), which is much stricter than the China 5 emission standard. Especially, China 6b incorporates limits on particulate matter (PM) and adopts the on-board diagnostic (OBD) requirements. Furthermore, it is implemented that vehicles should be tested under World Harmonized Light-duty Vehicle Test Cycle (WLTC). WLTC includes many steep accelerations and prolonged high-speed requirements, which demand high power output that could have caused "open-loop" situation (as fuel paddle needs to be pushed all the way down) at extended time (e.g., >5 sec) under rich (lambda <1) or under deep rich (lambda <0.8) conditions.

Albeit standards become more stringent, it is desirable to provide a further improved particulate filter providing higher conversion of pollutants such as NOx, HC and CO.

SUMMARY

The present invention relates to a catalyzed particulate filter, in particular a catalyzed particulate filter for use in an emission treatment system of an internal combustion engine.

Aspects include catalyzed particulate filters for exhaust gas treatment from internal combustion engines comprising a particulate filter, and a zoned catalytic layer Other aspects include systems for exhaust gas treatment from internal combustion engines comprising the catalyzed particulate filter, and one or more of a selective catalytic reduction (SCR) catalyst, a three way conversion (TWC) catalyst, a diesel oxidation catalyst (DOC), an ammonia oxidation (AMOx) catalyst, a NOx trap, a NOx absorber catalyst, a hydrocarbon trap catalyst.

Other aspects include methods for preparing the catalyzed particulate filter, and methods for the treatment of exhaust gas from internal combustion engines.

DETAILED DESCRIPTION

Figure 1A:
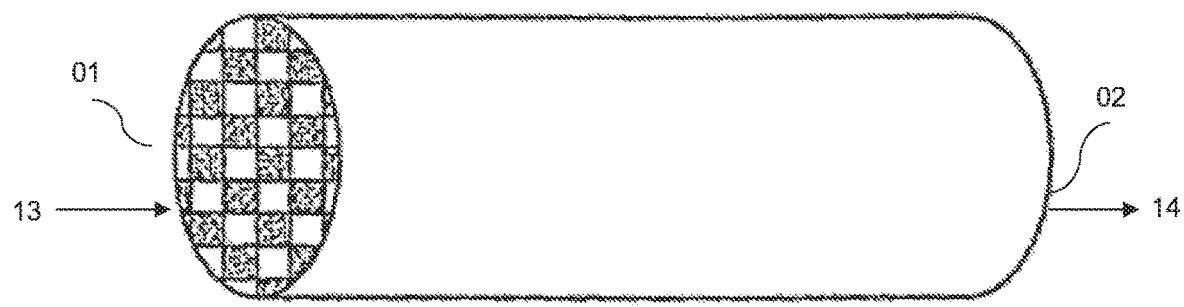
FIGS. 1(a) and (b) show an exemplary wall-flow filter.

Before describing several exemplary embodiments of the invention, it is to be understood that the invention is not limited to the details of construction or process steps set forth in the following description. The invention is capable of other embodiments and of being practiced or being carried out in various ways.

With respect to the terms used in this disclosure, the following definitions are provided.

Throughout the description, including the claims, the term "comprising one" or "comprising a" should be understood as being synonymous with the term "comprising at least one", unless otherwise specified, and "between" or "to" should be understood as being inclusive of the limits.

The terms "a", "an" and "the" are used to refer to one or to more than one (i.e., to at least one) of the grammatical object of the article.

The term "and/or" includes the meanings "and", "or" and also all the other possible combinations of the elements connected to this term.

All percentages and ratios are mentioned by weight unless otherwise indicated.

Thus, according to one aspect of the invention, provided is a catalyzed particulate filter for exhaust gas treatment from an internal combustion engine comprising:

(1) a particulate filter comprising a porous substrate having a total substrate length (L) an inlet surface, an outlet surface, an inlet axial end, an outlet axial end;

(2) a catalytic layer comprising a support material, and at least one platinum group metal (PGM) selected from platinum, palladium and rhodium; the catalytic layer being coated onto the inlet side, the outlet side, or both sides of the particulate filter;

wherein the catalytic layer comprises a first zone, a second zone, and a third zone;

the first zone begins at the inlet axial end and has a first length (L1) extending for 10-45% of the total substrate length (L); the third zone begins at the outlet axial end and has a third length (L3) extending for 10-45% of the total substrate length (L); the second zone begins at the axial end of first zone, ends at the axial beginning of the third zone; and wherein the content of PGM in the first zone is higher than the content of PGM in the second zone, and the content of PGM in the third zone is higher than the content of PGM in the second zone, calculated as the weight of platinum group metal per zone volume.

In the following content, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The particulate filter is typically formed of a porous substrate. The porous substrate may comprise a ceramic material such as, for example, cordierite, silicon carbide, silicon nitride, zirconia, mullite, spodumene, alumina-silica-magnesia, zirconium silicate, and/or aluminium titanate, typically cordierite or silicon carbide. The porous substrate may be a porous substrate of the type typically used in emission treatment systems of internal combustion engines.

The internal combustion engine may be a lean-burn engine, a diesel engine, a natural gas engine, a power plant, an incinerator, or a gasoline engine.

The porous substrate may exhibit a conventional honeycomb structure. The filter may take the form of a conventional "flow-through filter". Alternatively, the filter may take the form of a conventional "wall flow filter" (WFF). Such filters are known in the art.

Figure 1B:
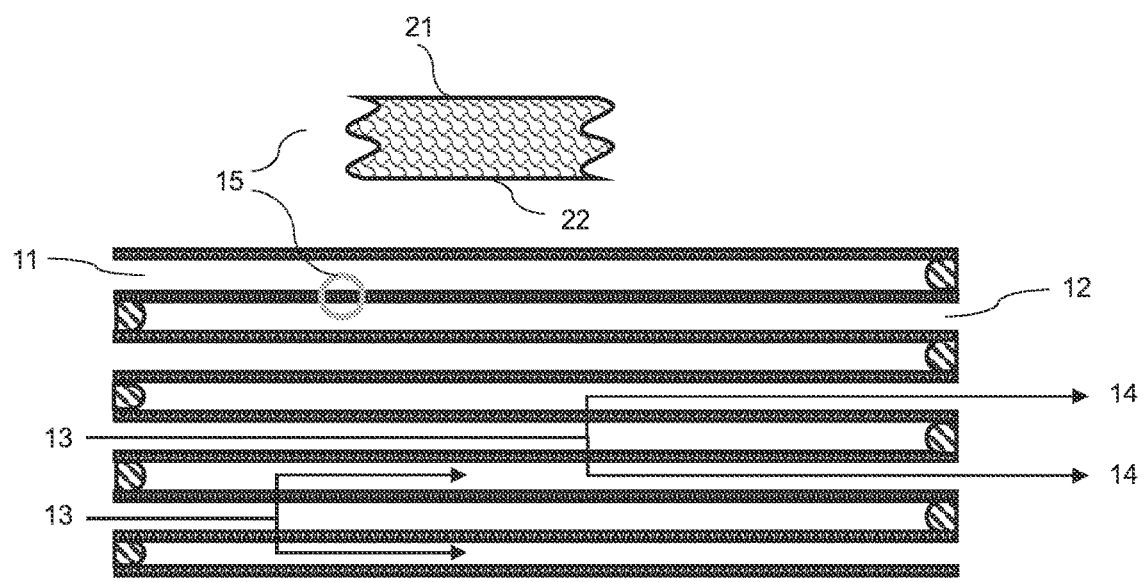

The particulate filter is preferably a wall-flow filter. Referring to FIG. 1(a) and FIG. 1(b), an exemplary wall-flow filter is provided. Wall-flow filters work by forcing a flow of exhaust gases (13) (including particulate matter) to pass through walls formed of a porous material.

A wall flow filter typically has a first axial end and a second axial end defining a longitudinal direction therebetween. In use, one of the first axial end and the second axial end will be the inlet axial end for exhaust gases (13) and the other will be the outlet axial end for the treated exhaust gases (14). A conventional wall flow filter has first and second pluralities of channels extending in the longitudinal direction. The first plurality of channels (11) is open at the inlet axial end (01) and closed at the outlet axial end (02). The second plurality of channels (12) is open at the outlet axial end (02) and closed at the inlet axial end (01). The channels are preferably parallel to each other to provide a constant wall thickness between the channels. As a result, gases entering one of the plurality of channels from the inlet axial end cannot leave the monolith without diffusing through the channel walls (15) from the inlet side (21) to the outlet side (22) into the other plurality of channels. The channels are closed with the introduction of a sealant material into the open end of a channel. Preferably the number of channels in the first plurality is equal to the number of channels in the second plurality, and each plurality is evenly distributed throughout the monolith. Preferably, within a plane orthogonal to the longitudinal direction, the wall flow filter has from 100 to 500 channels per square inch, preferably from 200 to 400. For example, on the inlet axial end (01), the density of open channels and closed channels is from 200 to 400 channels per square inch. The channels can have cross sections that are rectangular, square, circular, oval, triangular, hexagonal, or other polygonal shapes.

In one or more embodiments, the catalytic layer may be coated on the inlet side (21) of the porous walls of the filter, the outlet side (22) of the porous walls of the filter, or both sides (21 and 22). The loading may be characterized as "on wall" loading or "in wall" loading. The former is characterized by the formation of a catalytic layer on a surface of the porous walls (15). The latter is characterized by extending partial of the catalytic layer thorough the thickness of the porous walls (15).

In one or more embodiments, the mean pore size of the particulate filter is from 8 to 24 μm, preferably 10 to 20 μm.

In one or more embodiments, the PGM is present in a catalytically effective amount to convert NOx, CO and hydrocarbons in an exhaust gas to $N_2$, $CO_2$ and $H_2O$ and to cause the oxidation of particulate matter trapped on the particulate filter.

In one or more embodiments, the particulate filter comprises 0-30 $g/ft^3$ of rhodium, 0-100 $g/ft^3$ of platinum, and 0-100 $g/ft^3$ of palladium, calculated as the metal.

In one or more embodiments, the catalytic layer contains PGM with a total precious metal loading in the range of 2 to 125 $g/ft^3$, calculated as the metal.

In some embodiments, the first zone comprises palladium and rhodium, the second zone comprises palladium, the third zone comprises palladium and rhodium.

In other embodiments, the first zone comprises platinum and rhodium, the second zone comprises platinum, the third zone comprises platinum and rhodium.

In other embodiments, the first zone comprises platinum and palladium, the second zone comprises platinum, the third zone comprises platinum and palladium.

In other embodiments, the first zone comprises platinum and palladium, the second zone comprises palladium, the third zone comprises platinum and palladium.

In other embodiments, the first zone comprises palladium and rhodium, the second zone comprises rhodium, the third zone comprises palladium and rhodium.

In other embodiments, the first zone comprises platinum and rhodium, the second zone comprises rhodium, the third zone comprises platinum and rhodium.

In other embodiments, the first zone comprises platinum, palladium and rhodium, the second zone comprises platinum, the third zone comprises platinum, palladium and rhodium.

In other embodiments, the first zone comprises platinum, palladium and rhodium, the second zone comprises palladium, the third zone comprises platinum, palladium and rhodium.

In other embodiments, the first zone comprises platinum, palladium and rhodium, the second zone comprises rhodium, the third zone comprises platinum, palladium and rhodium.

In other embodiments, the first zone comprises platinum, palladium and rhodium, the second zone comprises platinum and palladium, the third zone comprises platinum, palladium and rhodium.

In other embodiments, the first zone comprises platinum, palladium and rhodium, the second zone comprises palladium and rhodium, the third zone comprises platinum, palladium and rhodium.

In other embodiments, the first zone comprises platinum, palladium and rhodium, the second zone comprises platinum and rhodium, the third zone comprises platinum, palladium and rhodium.

In one or more embodiments, the catalytic layer comprises from about 50 wt. % to about 99.9 wt. %, including about 60 wt. % to about 99.8 wt. %, including about 70 wt. % to about 99.6 wt. % of hydrothermally stable support material, based on the calcined weight of the catalytic layer.

In one or more preferred embodiments, the catalytic layer may, for example, comprise from about 5 to about 90 wt. % of alumina, preferably from about 10 to about 75 wt. % of alumina, based on the calcined weight of the catalytic layer.

In one or more preferred embodiments, the catalytic layer may, for example, comprise from about 5 to about 70 wt. % of zirconia, preferably from about 10 to about 40 wt. % of zirconia, based on the calcined weight of the catalytic layer.

In one or more preferred embodiments, the catalytic layer may, for example, comprise from about 5 to about 60 wt. % of ceria, preferably from about 10 to about 30 wt. % of ceria, based on the calcined weight of the catalytic layer.

In one preferred embodiment, the particle size distribution of the hydrothermally stable support material in the catalytic layer in this invention is in the range of 500 nm to 50 μm. The specific surface area of said hydrothermally stable support material is in the range of 30-200 m$^2$/g at fresh state and 10-150 m$^2$/g after 4 hr calcination in air at 1000° C.

Typically, the catalytic layer of the invention are loaded onto a filter at a loading in the range of at least about 5 g/L, about 10 g/L, about 15 g/L, about 20 g/L, about 25 g/L or about 30 g/L up to about 150 g/L, about 175 g/L, about 200 g/L, about 225 g/L, about 250 g/L about 275 g/L, about 300 g/L or about 325 g/L. It is to be understood that each lower endpoint and each higher endpoint disclosed in the foregoing may be combined to form a catalytic layer loading range that is expressly contemplated by the invention. In certain exemplary embodiments, the catalytic layer loading is in the range of 10 to 170 g/L.

In one or more embodiments, the first length (L1) extends for 15-45% of the total substrate length (L); the third length (L3) extends for 15-45% of the total substrate length (L). In specific embodiments, the first length (L1) extends for 2045% of the total substrate length (L); In more specific embodiments, the first length (L1) extends for 25-40% of the total substrate length (L); the third length (L3) extends for 2540% of the total substrate length (L).

In one or more embodiments, the particulate filter is canned. In an alternative embodiment, the filter is uncanned. Being "canned" means that the particulate filter has been incorporated into a housing for incorporation into an emission treatment system.

Being "uncanned" means that the particulate filter has not yet been incorporated into a housing for incorporation into an emission treatment system but is still coated with the catalytic layer. In a typical canning process, the particulate filter is sleeved in a support mat, typically formed of ceramic fibers or alumina fibers, before being incorporated into a metal housing. Methods of incorporating the particulate filter into a metal housing include, for example, "clamshell", "stuffing and "tourniquet" techniques. Such techniques are known in the art.

According to another aspect of the invention, provided is a system for exhaust gas treatment from an internal combustion engine comprising: the catalyzed particulate filter, and one or more of a selective catalytic reduction (SCR) catalyst, a three way conversion (TWC) catalyst, a diesel oxidation catalyst (DOC), an ammonia oxidation (AMOx) catalyst, a NOx trap, a NOx absorber catalyst, a hydrocarbon trap catalyst.

As used herein, the terms of "selective catalytic reduction" and "SCR" refer to the catalytic process of reducing oxides of nitrogen to dinitrogen ($N_2$) using a nitrogenous reductant. The SCR catalyst may include at least one material selected front MOR; USY; ZSM-5; ZSM-20; beta-zeolite; CHA; LEV; AEI; AFX; FER; SAPO; ALPO; vanadium; vanadium oxide; titanium oxide; tungsten oxide; molybdenum oxide; cerium oxide; zirconium oxide; niobium oxide; iron; iron oxide; manganese oxide; copper; molybdenum; tungsten; and mixtures thereof. The support structures for the active components of the SCR catalyst may include any suitable zeolite, zeotype, or non-zeolitic compound. Alternatively, the SCR catalyst may include a metal, a metal oxide, or a mixed oxide as the active component. Transition metal loaded zeolites (e.g., copper-chabazite, or Cu-CHA, as well as copper-levyne, or Cu-LEV, as well as Fe-Beta) and zeotypes (e.g., copper-SAPO, or Cu-SAPO) are preferred.

As used herein, the terms of "three-way conversion" and "TWC" refer to a catalytic process that can substantially eliminate HC, CO and NOx from gasoline engine exhaust gases. Typically, a TWC catalyst mainly comprises a platinum group metal (PGM), an oxygen storage component (OSC), and a refractory metal oxide support.

As used herein, the terms of "platinum group metal" and "PGM" refer to one or more chemical elements defined in the Periodic Table of Elements, including platinum, palladium, rhodium, osmium, iridium, and ruthenium, and mixtures thereof.

In some embodiments, the platinum group metal component of the TWC catalyst is selected from platinum, palladium, rhodium, or mixtures thereof. In specific embodiments, the platinum group metal component of the TWC catalyst comprises palladium.

In some embodiments, the TWC catalyst does not comprise an additional platinum group metal (i.e., the TWC comprises only one platinum group metal). In other embodiments, the TWC catalyst comprises an additional platinum group metal. In one or more embodiments, when present, the additional platinum group metal is selected from platinum, rhodium, and mixtures thereof. In specific embodiments, the additional platinum group metal component comprises rhodium. In one or more specific embodiments, the TWC catalyst comprises a mixture of palladium and rhodium. In other embodiments, the TWC catalyst comprises a mixture of platinum, palladium, and rhodium.

As used herein, the terms of "oxygen storage component" and "OSC" refer to an entity that has a multi-valence state and can actively react with reductants such as CO or hydrogen under reduction conditions and then react with oxidants such as oxygen or nitrogen oxides under oxidative conditions. Examples of oxygen storage components include rare earth oxides, particularly ceria, lanthana, praseodymia, neodymia, niobia, europia, samaria, ytterbia, yttria, zirconia, and mixtures thereof in addition to ceria. The rare earth oxide may be in bulk (e.g. particulate) form. The oxygen storage component can include ceria in a form that exhibits oxygen storage properties. The lattice oxygen of ceria can react with carbon monoxide, hydrogen, or hydrocarbons under rich A/F conditions. In one or more embodiments, the oxygen storage component for the TWC catalyst comprises a ceria-zirconia composite or a rare earth-stabilized ceria-zirconia.

As used herein, the terms of "refractory metal oxide support" and "support" refer to underlying high surface area material upon which additional chemical compounds or elements are carried. The support particles have pores larger than 20 A and a wide pore distribution. As defined herein, such supports, e.g., metal oxide supports, exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa, and theta alumina phases. Refractory metal oxides other than activated alumina can be used as a support for at least some of the catalytic components in a given catalyst. For example, bulk ceria, zirconia, alpha alumina, silica, titania, and other materials are known for such use.

In some embodiments, the refractory metal oxide supports for the TWC catalyst independently comprise a compound that is activated, stabilized, or both, selected from the group consisting of alumina, zirconia, alumina-zirconia, lanthana-alumina, lanthana-zirconia-alumina, alumina-chromia, ceria, alumina-ceria, and combinations thereof.

As used herein, the terms of "diesel oxidation catalyst" and "DOC" refer to diesel oxidation catalysts, which are well-known in the art. Diesel oxidation catalysts are designed to oxidize CO to $CO_2$ and gas phase HC and an organic fraction of diesel particulates (soluble organic fraction) to $CO_2$ and $H_2O$. Typical diesel oxidation catalysts include platinum and optionally also palladium on a high surface area inorganic oxide support, such as alumina, silica-alumina, titania, silica-titania, and a zeolite. As used herein, the term includes a DEC (Diesel Exotherm Catalyst) which creates an exotherm.

As used herein, the terms of "ammonia oxidation catalyst" and "AMOx" refer to catalysts comprise at least a supported precious metal component, such as one or more platinum group metals (PGMs), which is effective to remove ammonia from an exhaust gas stream. In specific embodiments, the precious metal may include platinum, palladium, rhodium, ruthenium, iridium, silver or gold. In specific embodiments, the precious metal component includes physical mixtures or chemical or atomically-doped combinations of precious metals.

The precious metal component is typically deposited on a high surface area refractory met-al oxide support. Examples of suitable high surface area refractory metal oxides include alumina, silica, titania, ceria, and zirconia, magnesia, barium oxide, manganese oxide, tungsten oxide, and rear earth metal oxide rear earth metal oxide, base metal oxides, as well as physical mixtures, chemical combinations and/or atomically-doped combinations thereof.

As used herein, the terms of "NOx adsorbed catalyst" and "NOx trap (also called Lean NOx trap, abbr. LNT)" refer to catalysts for reducing oxides of nitrogen (NO and $NO_2$) emissions from a lean burn internal combustion engine by means of adsorption. Typical NOx trap includes alkaline earth metal oxides, such as oxides of Mg, Ca, Sr and Ba, alkali metal oxides such as oxides of Li, Na, K, Rb and Cs, and rare earth metal oxides such as oxides of Ce, La, Pr and Nd in combination with precious metal catalysts such as platinum dispersed on an alumina support have been used in the purification of exhaust gas from an internal combustion engine. For NOx storage, baria is usually preferred because it forms nitrates at lean engine operation and releases the nitrates relatively easily under rich conditions.

As used herein, the term of "hydrocarbon trap" refers to catalysts for trapping hydrocarbons during cold operation periods and releasing them for oxidation during higher-temperature operating periods. The hydrocarbon trap may be provided by one or more hydrocarbon (HC) storage components for the adsorption of various hydrocarbons (HC). Typically, hydrocarbon storage material having minimum interactions of precious metals and the material can be used, e.g., a micro-porous material such as a zeolite or zeolite-like material. Preferably, the hydrocarbon storage material is a zeolite. Beta zeolite is particularly preferable since large pore opening of beta zeolite allows hydrocarbon molecules of diesel derived species to be trapped effectively. Other zeolites such as faujasite, chabazite, clinoptilolite, mordenite, silicalite, zeolite X, zeolite Y, ultrastable zeolite Y, ZSM-5 zeolite, offretite, can be used in addition to the beta zeolite to enhance HC storage in the cold start operation.

According to another aspect of the invention, provided is a method for preparing the catalyzed particulate filter, said method comprises the steps of:
1) forming an aqueous slurry comprising a first PGM, optionally using one or more precursors thereof, and a support material;
2) milling and coating the aqueous slurry onto the particulate filter;
3) calcining the particulate filter coated with the first PGM;
4) impregnating a second PGM by dipping the inlet axial end and the outlet axial end of the particulate filter in a solution containing the second PGM;
5) calcining the particulate filter coated with the first PGM and dipped with the second PGM.

In step 1), the precursor of the first PGM may be in the form of a chloride, nitrate, acetate, ammonia or amine complex hydroxide solution, or in the form of highly dispersed colloidal metal dispersion.

In step 4), the second PGM may be in the form of a chloride, nitrate, acetate, ammonia or ammine complex hydroxide solution, or in the form of a highly dispersed colloidal metal dispersion.

The calcination temperature in step 3) and 5) could independently be from 250° C. to 1000° C., preferably from 300° C. to 700° C., more preferably from 450° C. to 650° C. The calcination period may be from 10 minutes to 10 hours, preferably 0.5 hour to 8 hours, more preferably 1 hour to 4 hours.

Other aspects include methods for the treatment of exhaust gas from an internal combustion engine comprising: providing the particulate filter; and flowing the exhaust gas from the engine through the particulate filter. Typically, the exhaust gas comprises unburnt hydrocarbons, carbon monoxide, nitrogen oxides, and particulate matter.

EMBODIMENTS

Various embodiments are listed below. It will be understood that the embodiments listed below may be combined with all aspects and other embodiments in accordance with the scope of the invention.

Embodiment 1. A catalyzed particulate filter for exhaust gas treatment from an internal combustion engine comprising:
(1) a particulate filter comprising a porous substrate having a total substrate length (L) an inlet surface, an outlet surface, an inlet axial end, an outlet axial end;
(2) a catalytic layer comprising a support material, and at least one platinum group metal (PGM) selected from platinum, palladium and rhodium; the catalytic layer being coated onto the inlet side, the outlet side, or both sides of the particulate filter;
wherein the catalytic layer comprises a first zone, a second zone, and a third zone; the first zone begins at the inlet axial end and has a first length (L1) extending for 10-45% of the total substrate length (L); the third zone begins at the outlet axial end and has a third length (L3) extending for 10-45% of the total substrate length (L); the second zone begins at the axial end of first zone, ends at the axial beginning of the third zone; and
wherein the content of PGM in the first zone is higher than the content of PGM in the second zone, and the content of PGM in the third zone is higher than the content of PGM in the second zone, calculated as the weight of platinum group metal per zone volume.

Embodiment 2. The catalyzed particulate filter according to Embodiment 1, wherein the particulate filter is a wall-flow filter comprising a honeycomb structure.

Embodiment 3. The catalyzed particulate filter according to Embodiment 1 or 2, wherein the mean pore size of the particulate filter is from 8 to 24 μm, preferably 10 to 20 μm.

Embodiment 4. The catalyzed particulate filter according to any one of Embodiments 1 to 3, wherein the PGM is present in a catalytically effective amount to convert NOx, CO and hydrocarbons in an exhaust gas to $N_2$, $CO_2$ and $H_2O$ and to cause the oxidation of particulate matter trapped on the particulate filter.

Embodiment 5. The catalyzed particulate filter according to any one of Embodiments 1 to 4, wherein the particulate filter comprises 0-30 g/ft$^3$ of rhodium, 0-100 g/ft$^3$ of platinum, and 0-100 g/ft$^3$ of palladium, calculated as the metal.

Embodiment 6. The catalyzed particulate filter according to any one of Embodiments 1 to 5, wherein the catalytic layer has a loading in the range of 10 to 170 g/L.

Embodiment 7. The catalyzed particulate filter according to any one of Embodiments 1 to 6, wherein the first length (L1) extends for 15-45% of the total substrate length (L); the third length (L3) extends for 15-45% of the total substrate length (L).

Embodiment 8. A system for exhaust gas treatment from an internal combustion engine comprising: the catalyzed particulate filter according to any one of Embodiments 1 to 7, and one or more of a selective catalytic reduction (SCR) catalyst, a three way conversion (TWC) catalyst, a diesel oxidation catalyst (DOC), an ammonia oxidation (AMOx) catalyst, a NOx trap, a NOx absorber catalyst, a hydrocarbon trap catalyst.

Embodiment 9. A method for preparing the catalyzed particulate filter of any one of Embodiments 1 to 7, wherein said method comprises the steps of
1) forming an aqueous slurry comprising a first PGM, optionally using one or more precursors thereof, and a support material;
2) milling and coating the aqueous slurry onto the particulate filter;
3) calcining the particulate filter coated with the first PGM;
4) impregnating a second PGM by dipping the inlet axial end and the outlet axial end of the particulate filter in a solution containing the second PGM;
5) calcining the particulate filter coated with the first PGM and dipped with the second PGM.

Embodiment 10. A method for the treatment of exhaust gas from an internal combustion engine comprising:
(1) the catalyzed particulate filter according to any one of Embodiments 1 to 7, and
(2) flowing the exhaust gas from the engine through the catalyzed particulate filter.

Embodiment 11. The method according to Embodiment 10, wherein the exhaust gas comprises unburned hydrocarbons, carbon monoxide, nitrogen oxides, and particulate matter.

EXAMPLES

The present invention is further illustrated by the following examples, which are set forth to illustrate the present invention and is not to be construed as limiting thereof.

Unless otherwise noted, all parts and percentages are by weight, and all weight percentages are expressed on a dry basis, meaning excluding water content, unless otherwise indicated. In each of the examples, the filter substrate was made of cordierite.

Example 1—Comparative

Example 1 is a particulate filter having a Pd/Rh catalytic layer with a PGM loading of 25 g/ft$^3$ (Pd/Rh=3/2). The Example 1 was prepared using a single coat from inlet side of a wall-flow filter substrate. The wall-flow filter substrate had a size of 118.4 mm (D)*127 mm (L), a volume of 1.40 L, a cell density of 300 cells per square inch, a wall thickness of approximately 200 μm, a porosity of 65% and a mean pore size of 18 μm in diameter by mercury intrusion measurements.

Figure 2A:
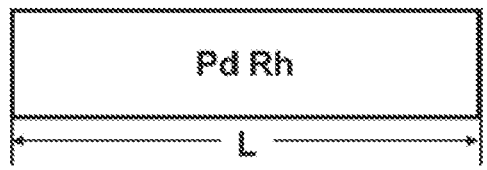
FIGS. 2(a), (b), (c), (d), (e), (f) and (g) show PGM distribution layouts for Examples 1 to 7.

The Pd/Rh catalytic layer coated onto the substrate contains a prior art three-way conversion (TWC) catalyst composite. The PGM distribution layouts is illustrated in FIG. 2(a). The catalytic layer was prepared as following:

Palladium in the form of a palladium nitrate solution was impregnated by planetary mixer onto a refractory alumina and a stabilized ceria-zirconia composite with approximately 40 wt % ceria to form a wet powder while achieving incipient wetness. Rhodium in the form of a rhodium nitrate solution was impregnated by planetary mixer onto a refractory alumina and a stabilized ceria-zirconia composite with approximately 40 wt. % ceria to form a wet powder while achieving incipient wetness. An aqueous slurry was formed by adding the above powders into water, followed by addition of barium hydroxide and zirconium nitrate solution. The slurry was then milled to a particle size of 90% being 5 μm. The slurry was then coated from the inlet side of the wall-flow filter substrate and covering the total substrate length using deposition methods known in the art. After coating, the filter substrate plus the inlet coat were dried at 150° C. and then calcined at a temperature of 550° C. for about 1 hour. The calcined Pd/Rh catalytic layer was having 24.8 wt. % alumina, 68.5 wt. % coria-zirconia composite, 0.47 wt. % palladium, 0.23 wt. % rhodium, 4.6 wt % of barium oxide and 1.4 wt. % zirconia oxide. The total loading of the catalytic layer was 1.24 g/in$^3$.

Example 2

Figure 2B:
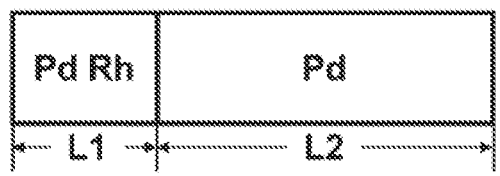

Example 2 is a particulate filter having a first Pd catalytic layer with a Pd loading of 15 g/ft$^3$, coated onto the substrate from inlet side and covering the total substrate length; and a second Rh catalytic component with a local Rh loading of 33.3 g/ft$^3$, coated onto the substrate from inlet side and covering 30% of the total substrate length. The PGM distribution layouts is illustrated in FIG. 2(b).

The wall-flow filter substrate had a size of 118.4 mm (D)*127 mm (L), a volume of 1.40 L, a cell density of 300 cells per square inch, a wall thickness of approximately 200 μm, a porosity of 65% and a mean pore size of 18 μm in diameter by mercury intrusion measurements.

The first Pd catalytic layer was prepared as following:

Palladium in the form of a palladium nitrate solution was impregnated by planetary mixer onto a refractory alumina and a stabilized ceria-zirconia composite with approximately 40 wt % ceria to form a wet powder while achieving incipient wetness. An aqueous slurry was formed by adding the above powders into water, followed by addition of barium hydroxide and zirconium nitrate solution. The slurry was then milled to a particle size of 90% being 5 μm. The slurry was then coated from the inlet side of the wall-flow filter substrate using deposition methods known in the art to cover 100% of the total substrate length. After coating, the filter substrate plus the inlet coat were dried at 150° C. and then calcined at a temperature of 550° C. for about 1 hour. The calcined Pd catalytic layer was having 24.8 wt % alumina, 68.5 wt. % ceria-zirconia composite, 0.70 wt. % palladium, 4.6 wt % of barium oxide and 1.4 wt. % zirconia oxide. The total loading of the catalytic layer was 1.24 g/in$^3$ for 100% of the total substrate volume.

The second Rh catalytic component was prepared as following:

In total, 10 g/ft$^3$ rhodium, in the form of a rhodium nitrate solution, was deposited such that it covers 30% of the substrate length from the inlet axial end of the filter. In this case, the substrate already contains the first Pd catalytic layer. In a subsequent step, the filter was dried at 150° C. and then calcined at a temperature of 550° C. for about 1 hour in air.

Example 3

Figure 2C:
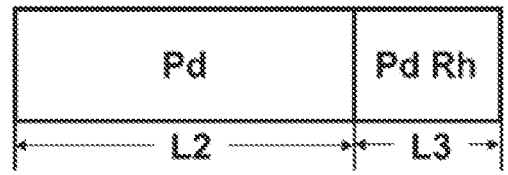

Example 3 was prepared in the similar way as Example 2, except that the second Rh catalytic component was deposited from outlet axial end to cover 30% of the substrate length from outlet side. The PGM distribution layouts is illustrated in FIG. 2(c).

Example 4

Figure 2D:
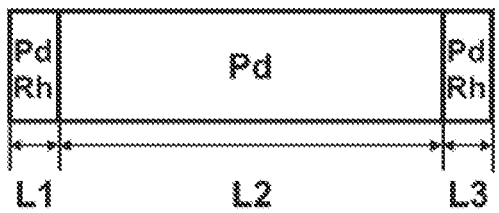

Example 4 is a particulate filter having a first Pd catalytic layer with a Pd loading of 15 g/ft$^3$, coated onto the substrate from inlet side and covering the total substrate length; and a second Rh catalytic component with a local Rh loading of 50 g/ft$^3$, coated onto the substrate from both inlet and outlet side and covering, at both sides, 10% of the total substrate length. The PGM distribution layouts is illustrated in FIG. 2(d).

Example 4 was prepared in the similar way as Example 2, except that the second Rh catalytic component was deposited from both inlet and outlet axial end to cover 10% of the substrate length from each side.

Example 5

Figure 2E:
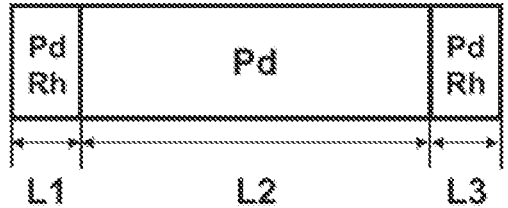

Example 5 was prepared in the similar way as Example 4, except that the covering length of the second Rh catalytic component is 15% of the substrate length from both inlet and outlet axial end. The PGM distribution layouts is illustrated in FIG. 2(e).

Example 6

Figure 2F:
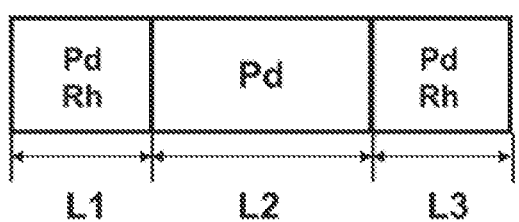

Example 6 was prepared in the similar way as Example 4, except that the covering length of the second Rh catalytic component is 30% of the substrate length from both inlet and outlet axial end. The PGM distribution layouts is illustrated in FIG. 2(f).

Example 7

Figure 2G:
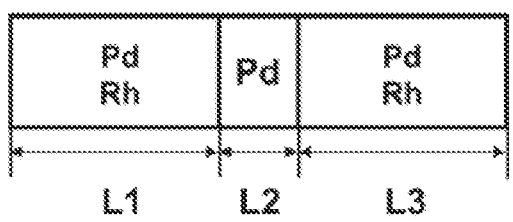

Example 7 was prepared in the similar way as Example 4, except that the covering length of the second Rh catalytic component is 45% of the substrate length from both inlet and outlet axial end. The PGM distribution layouts is illustrated in FIG. 2(g).

The total catalytic layer loading and total precious metal loading of Examples 1 to 7 are identical, despite of different PGM distribution layouts, which is illustrated in Table 1.

TABLE 1

| Example # | L1 (% of total substrate length L) | L2 (% of total substrate length L) | L3 (% of total substrate length L) |
|---|---|---|---|
| Example 1 - Comparative | — | — | — |
| Example 2 | 30 | 70 | — |
| Example 3 | — | 70 | 30 |
| Example 4 | 10 | 80 | 10 |
| Example 5 | 15 | 70 | 15 |
| Example 6 | 30 | 40 | 30 |
| Example 7 | 45 | 10 | 45 |
| Example 9 - Comparative | — | — | — |
| Example 10 | 30 | 40 | 30 |
| Example 12 Comparative | — | — | — |
| Example 13 | 30 | 40 | 30 |

Example 8—Testing of Catalysts

All catalysts prepared in examples 1 to 7 were aged under an exothermic ageing protocol using an engine setup to operate such that the typical inlet temperature is ~875° C. and the typical catalyst bed temperature is ~925° C. and does not exceed ~980° C. The engine-out gas feed composition alternates between rich and lean to simulate typical operating conditions for a vehicle durability test. All catalytic filters were aged using the same conditions for 150 hours.

The emission performance was tested using a 2.0 L turbo-charged engine with a CC-only emission control system configuration operating under the WLTC test protocol. Each catalytic filter was tested at least three times to assure high experiment repeatability and data consistence.

Figure 5:
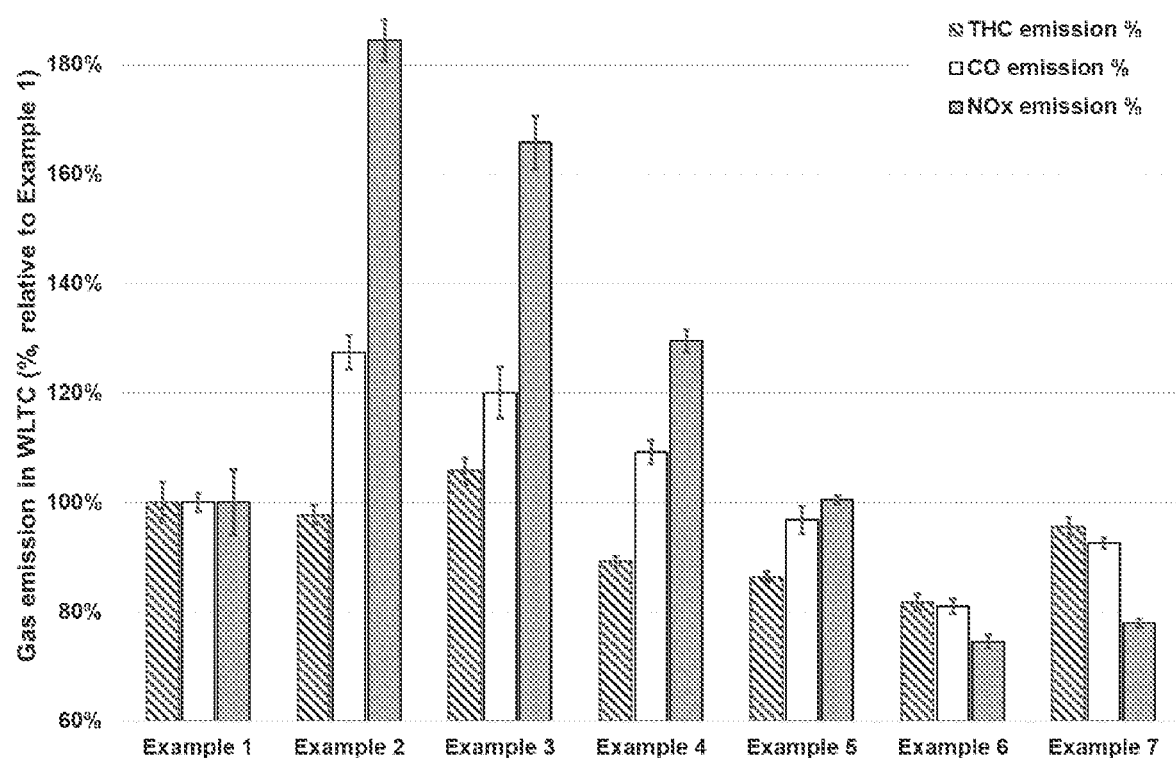
FIG. 5 shows a plot of gas emission results of catalyzed particulate filters according to embodiments of the present invention (Examples 2 to 7) and a prior art particulate filter (Example 1), tested under WLTC cycle.

An optimal way of using the solution absorption for platinum group metal, in this case, rhodium, in filter catalyst, is exhibited in FIG. 5. The best performers, invention catalyst Examples 5 to 7, are showing up to ~20% THC, ~20% CO, and ~25% NO$_x$ improvement in the WLTC test compared to reference Example 1 at the same platinum group metal loading without a change in the washcoat support formulation. This is attributed to carefully designed rhodium enrichment zone, by PGM solution absorption, at both inlet and outlet axial ends and with an optimal zone length. Examples 2 and 3, with rhodium only enriched at single end of the filter part; and Example 4, with very short rhodium zone length, although at both ends of the filter part, were not showing comparable gas phase conversion activities as Examples 5 to 7.

Example 9—Comparative

Example 9 is a particulate filter having a Pd/Rh catalytic layer with a PGM loading of 15 g/ft$^3$ (Pd/Rh=2/1). The Example 9 was prepared using a single coat from inlet side of a wall-flow filter substrate. The wall-flow filter substrate had a size of 118.4 mm (D)*127 mm (L), a volume of 1.40 L, a cell density of 300 cells per square inch, a wall thickness of approximately 200 μm, a porosity of 65% and a mean pore size of 18 μm in diameter by mercury intrusion measurements.

Figure 3A:
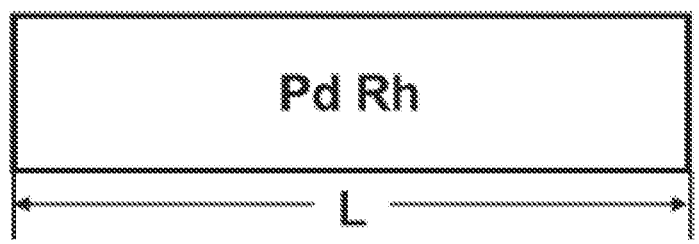
FIGS. 3(a) and (b) show PGM distribution layouts for Examples 9 and 10.

The Pd/Rh catalytic layer coated onto the substrate contains a prior art three-way conversion (TWC) catalyst composite. The PGM distribution layouts is illustrated in FIG. 3(a). The catalytic layer was prepared as following:

Palladium in the form of a palladium nitrate solution was impregnated by planetary mixer onto a refractory alumina and a stabilized ceria-zirconia composite with approximately 40 wt % ceria to form a wet powder while achieving incipient wetness. Rhodium in the form of a rhodium nitrate solution was impregnated by planetary mixer onto a refractory alumina and a stabilized ceria-zirconia composite with approximately 40 wt % ceria to form a wet powder while achieving incipient wetness. An aqueous slurry was formed by adding the above powders into water, followed by addition of barium hydroxide and zirconium nitrate solution. The slurry was then milled to a particle size of 90% being 5 μm. The slurry was then coated from the inlet side of the wall-flow filter substrate and covering the total substrate length using deposition methods known in the art. After coating, the filter substrate plus the inlet coat were dried at 150° C. and then calcined at a temperature of 550° C. for about 1 hour. The calcined Pd/Rh catalytic layer was having 24.8 wt. % alumina, 68.5 wt. % ceria-zirconia composite, 0.47 wt. % palladium, 0.23 wt. % rhodium, 4.6 wt % of barium oxide and 1.4 wt. % zirconia oxide. The total loading of the catalytic layer was 1.24 g/in$^3$.

Example 10

Figure 3B:
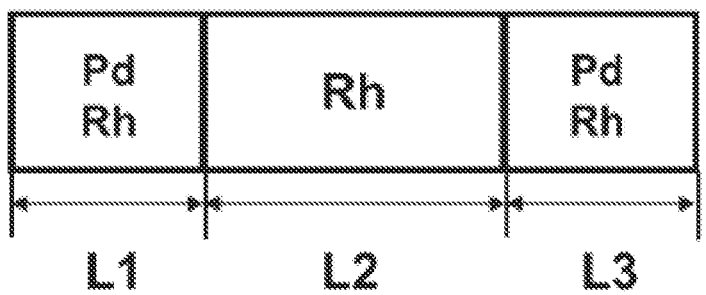

Example 10 is a particulate filter having a first Rh catalytic layer with a Rh loading of 5 g/ft$^3$, coated onto the substrate from inlet side and covering the total substrate length; and a second Pd catalytic component with a local Pd loading of 33.3 g/ft$^3$, coated onto the substrate from both inlet axial end and outlet axial end and each covering 30% of the total substrate length. The PGM distribution layouts is illustrated in FIG. 3(b).

The first Rh catalytic layer was prepared as following:
Rhodium in the form of a rhodium nitrate solution was impregnated by planetary mixer onto a refractory alumina and a stabilized ceria-zirconia composite with approximately 40 wt % ceria to form a wet powder while achieving incipient wetness. An aqueous slurry was formed by adding the above powders into water, followed by addition of barium hydroxide and zirconium nitrate solution. The slurry was then milled to a particle size of 90% being 5 μm. The slurry was then coated from the inlet side of the wall-flow filter substrate using deposition methods known in the art to cover 100% of the total substrate length. After coating, the filter substrate plus the inlet coat were dried at 150° C. and then calcined at a temperature of 550° C. for about 1 hour. The calcined Rh catalytic layer was having 24.9 wt. % alumina, 68.9 wt. % ceria-zirconia composite, 0.23 wt. % rhodium, 4.6 wt. % of barium oxide and 1.4 wt. % zirconia oxide. The total loading of the catalytic layer was 1.23 g/in$^3$ for 100% of the total substrate volume.

The second Pd catalytic component was prepared as following:

In total, 10 g/ft$^3$ palladium, in the form of a palladium nitrate solution, was deposited such that it covers 30% of the substrate length from both inlet and outlet axial ends of the filter substrate already containing the first Rh catalytic layer. In a subsequent step, the filter was dried at 150° C. and then calcined at a temperature of 550° C. for about 1 hour in air.

The total catalytic layer loading and total precious metal loading of Examples 9 and 10 are identical, despite of different PGM distribution layouts, which is illustrated in Table 1.

Example 11—Testing of Catalysts

Both catalysts prepared in examples 9 and 10 were aged under an exothermic ageing protocol using an engine setup to operate such that the typical inlet temperature is ~875° C. and the typical catalyst bed temperature is ~925° C. and does not exceed ~980° C. The engine-out gas feed composition alternates between rich and lean to simulate typical operating conditions for a vehicle durability test. All catalytic filters were aged using the same conditions for 100 hours.

The emission performance was tested using a 1.5 L turbo-charged engine with a CC-only emission control system configuration operating under the WLTC test protocol. Each catalytic filter was tested at least three times to assure high experiment repeatability and data consistence.

Figure 6:
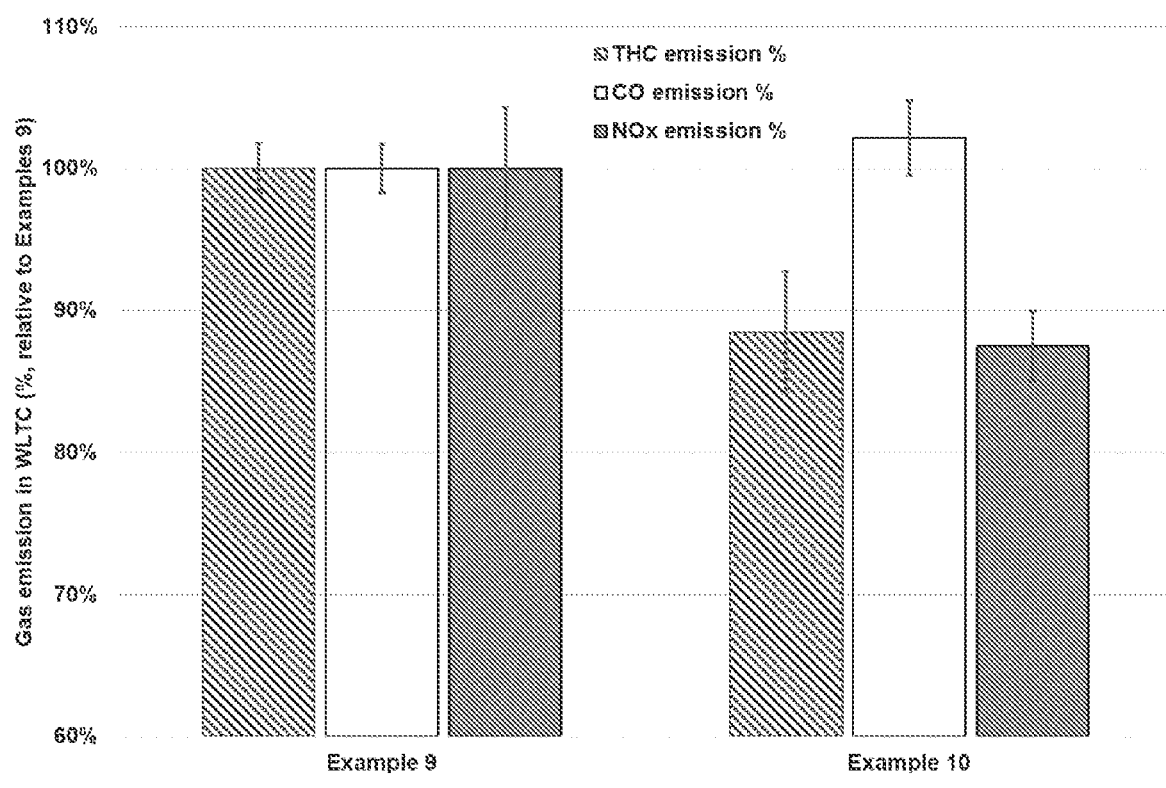
FIG. 6 shows a plot of gas emission results of catalyzed particulate filters according to embodiments of the present invention (Example 10) and a prior art particulate filter (Example 9), tested under WLTC cycle.

The benefit of solution absorption for palladium in optimized layout is demonstrated in FIG. 6. The invention catalyst Example 10 achieved ~10-15% THC and NO$_x$ improvement in the WLTC test compared to the reference Example 9, at same washcoat loading and total PGM loading.

Example 12—Comparative

Example 12 is a particulate filter having a Pt/Rh catalytic layer with a PGM loading of 25 g/ft$^3$ (Pt/Rh=3/2). The Example 12 was prepared using a single coat from inlet side of a wall-flow filter substrate. The wall-flow filter substrate had a size of 118.4 mm (D)*127 mm (L), a volume of 1.40 L, a cell density of 300 cells per square inch, a wall thickness of approximately 200 μm, a porosity of 65% and a mean pore size of 18 μm in diameter by mercury intrusion measurements.

Figure 4A:
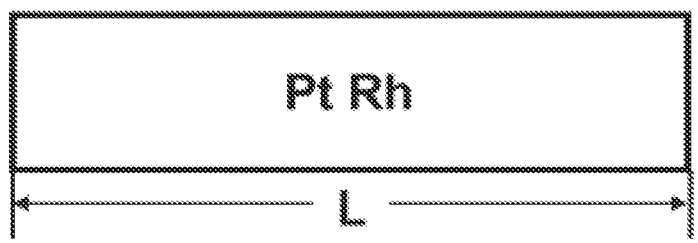
FIGS. 4(a) and (b) show PGM distribution layouts for Examples 12 and 13.

The Pt/Rh catalytic layer coated onto the substrate contains a prior art three-way conversion (TWC) catalyst composite. The PGM distribution layouts is illustrated in FIG. 4(a). The catalytic layer was prepared as following:

Platinum in the form of a platinum tetraamine oxide solution was impregnated by planetary mixer onto a refractory alumina and a stabilized ceria-zirconia composite with approximately 40 wt % ceria to form a wet powder while achieving incipient wetness. Rhodium in the form of a rhodium nitrate solution was impregnated by planetary mixer onto a refractory alumina and a stabilized ceria-zirconia composite with approximately 40 wt. % ceria to form a wet powder while achieving incipient wetness. An aqueous slurry was formed by adding the above powders into water, followed by addition of barium hydroxide and zirconium nitrate solution. The slurry was then milled to a particle size of 90% being 5 μm. The slurry was then coated from the inlet side of the wall-flow filter substrate and covering the total substrate length using deposition methods known in the art. After coating, the filter substrate plus the inlet coat were dried at 150° C. and then calcined at a temperature of 550° C. for about 1 hour. The calcined Pt/Rh catalytic layer was having 24.7 wt. % alumina, 68.2 wt. % ceria-zirconia composite, 0.70 wt % platinum, 0.47 wt. % rhodium, 4.6 wt. % of barium oxide and 1.4 wt. % zirconia oxide. The total loading of the catalytic layer was 1.24 g/in$^3$.

Example 13

Figure 4B:
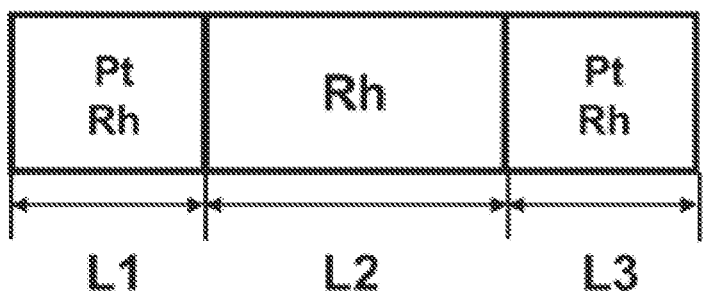

Example 13 is a particulate filter having a first Rh catalytic layer with a Rh loading of 10 g/ft$^3$, coated onto the substrate from inlet side and covering the total substrate length; and a second Pt catalytic component with a local Pt loading of 25 g/ft$^3$, coated onto the substrate from both inlet axial end and outlet axial end and each covering 30% of the total substrate length. The PGM distribution layouts is illustrated in FIG. 4(b).

The first Rh catalytic layer was prepared as following:

Rhodium in the form of a rhodium nitrate solution was impregnated by planetary mixer onto a refractory alumina and a stabilized ceria-zirconia composite with approximately 40 wt. % ceria to form a wet powder while achieving incipient wetness. An aqueous slurry was formed by adding the above powders into water, followed by addition of barium hydroxide and zirconium nitrate solution. The slurry was then milled to a particle size of 90% being 5 μm. The slurry was then coated from the inlet side of the wall-flow filter substrate using deposition methods known in the art to cover 100% of the total substrate length. After coating, the filter substrate plus the inlet coat were dried at 150° C. and then calcined at a temperature of 550° C. for about 1 hour. The calcined Rh catalytic layer was having 24.8 wt. % alumina, 68.7 wt. % ceria-zirconia composite, 0.47 wt. % rhodium, 4.6 wt. % of barium oxide and 1.4 wt. % zirconia oxide. The total loading of the catalytic layer was 1.23 g/in$^3$ for 100% of the total substrate volume.

The second Pt catalytic component was prepared as following:

In total, 15 g/ft$^3$ platinum, in the form of a platinum tetraamine oxide solution, was deposited such that it covers 30% of the substrate length from both inlet and outlet axial ends of the filter substrate already containing the first Rh catalytic layer. In a subsequent step, the filter was dried at 150° C. and then calcined at a temperature of 550° C. for about 1 hour in air.

The total catalytic layer loading and total precious metal loading of Examples 12 and 13 are identical, despite of different PGM distribution layouts, which is illustrated in Table 1.

Example 14—Testing of Catalysts

Both catalysts prepared in examples 12 and 13 were aged under an exothermic ageing protocol using an engine setup to operate such that the typical inlet temperature is ~875° C. and the typical catalyst bed temperature is ~925° C. and does not exceed ~980° C. The engine-out gas feed composition alternates between rich and lean to simulate typical operating conditions for a vehicle durability test. All catalytic filters were aged using the same conditions for 150 hours.

The emission performance was tested using a 2.0 L turbo-charged engine with a CC-only emission control system configuration operating under the WLTC test protocol. Each catalytic filter was tested at least three times to assure high experiment repeatability and data consistence.

Figure 7:
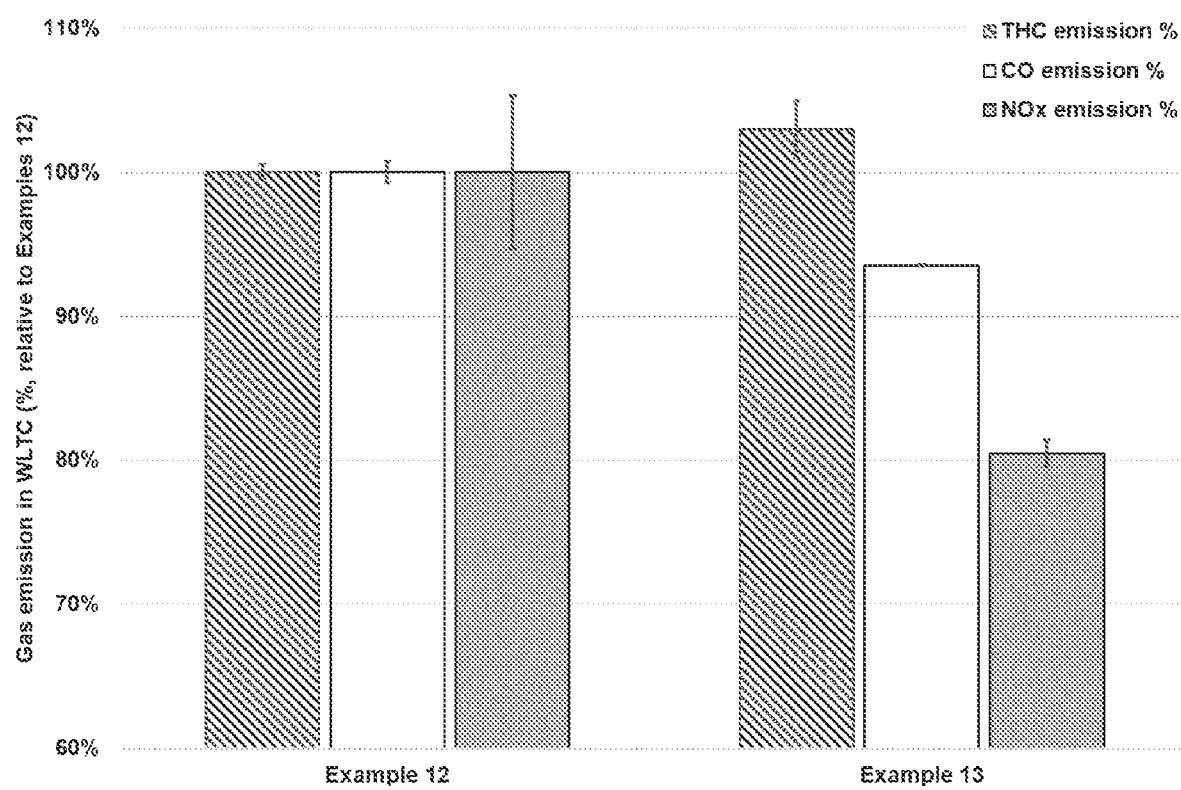
FIG. 7 shows a plot of gas emission results of catalyzed particulate filters according to embodiments of the present invention (Example 13) and a prior art particulate filter (Example 12), tested under WLTC cycle.

The benefit of solution absorption for platinum in optimized layout is demonstrated in FIG. 7. The invention catalyst Example 13 achieved ~7% CO and ~20% NO$_x$ improvement in the WLTC test compared to the reference Example 12, at same washcoat loading and total PGM loading.

What is claimed is:

1. A catalyzed particulate filter for exhaust gas treatment from an internal combustion engine comprising:
   (1) a particulate filter comprising a porous substrate having a total substrate length (L) an inlet surface, an outlet surface, an inlet axial end, and an outlet axial end;
   (2) a catalytic layer comprising a support material, and at least one platinum group metal (PGM) selected from the group consisting of platinum, palladium and rhodium; the catalytic layer being coated onto the particulate filter;
   wherein the catalytic layer comprises a first zone, a second zone, and a third zone;
   wherein the first zone begins at the inlet axial end and has a first length (L1) extending for 10-45% of the total substrate length (L); the third zone begins at the outlet axial end and has a third length (L3) extending for 10-45% of the total substrate length (L); the second zone begins at the axial end of first zone, ends at the axial beginning of the third zone;
   wherein the content of PGM in the second zone is not zero, the content of PGM in the first zone is higher than the content of the PGM in the second zone, and the content of PGM in the third zone is higher than the content of the PGM in the second zone, calculated as the weight of platinum group metal per zone volume; and
   wherein the PGM in the first zone and the third zone includes a first PGM and a second PGM being different from the first PGM;
   wherein PGM's varieties in the second zone are fewer than PGM's varieties in the first zone and are fewer than PGM's varieties in the third zone; and
   wherein the PGM in the second zone includes the first PGM, and an amount of the first PGM in the first zone, an amount of the first PGM in the second zone, and an amount of the first PGM in third zone are the same.

2. The catalyzed particulate filter according to claim 1, wherein the particulate filter is a wall-flow filter comprising a honeycomb structure.

3. The catalyzed particulate filter according to claim 1, wherein the mean pore size of the particulate filter is from 8 to 24 μm.

4. The catalyzed particulate filter according to claim 1, wherein the PGM is present in a catalytically effective amount to convert NOx, CO and hydrocarbons in an exhaust gas to $N_2$, $CO_2$ and $H_2O$ and to cause the oxidation of particulate matter trapped on the particulate filter.

5. The catalyzed particulate filter according to claim 1, wherein the entire catalyzed particulate filter comprises 0-30 g/ft$^3$ of rhodium calculated as metal rhodium, and one of:
   equal to or less than 100 g/ft$^3$ but greater than zero of platinum calculated as metal platinum, or
   equal to or less than 100 g/ft$^3$ but greater than zero of palladium calculated as metal palladium.

6. The catalyzed particulate filter according to claim 1, wherein the catalytic layer has a loading in the range of 10 to 170 gram per liter across the catalytic layer as a whole.

7. The catalyzed particulate filter according to claim 1, wherein the first length (L1) extends for 15-45% of the total substrate length (L); the third length (L3) extends for 15-45% of the total substrate length (L).

8. A system for exhaust gas treatment from an internal combustion engine comprising: the catalyzed particulate filter according to claim 1, and one or more of a selective catalytic reduction (SCR) catalyst, a three way conversion (TWC) catalyst, a diesel oxidation catalyst (DOC), an ammonia oxidation (AMOx) catalyst, a NOx trap, a NOx absorber catalyst, and a hydrocarbon trap catalyst.

9. A method for preparing the catalyzed particulate filter of claim 1, wherein said method comprises the steps of:
1) Forming an aqueous slurry comprising one or more precursors of the first PGM and a support material;
2) Milling and coating the aqueous slurry onto the particulate filter;
3) Calcining the particulate filter coated with the first PGM;
4) Impregnating the second PGM by dipping the inlet axial end and the outlet axial end of the particulate filter in solutions containing same or different amounts of the second PGM, respectively; and
5) Calcining the particulate filter coated with the first PGM and dipped with the second PGM.

10. A method for the treatment of exhaust gas from an internal combustion engine comprising:
flowing the exhaust gas from the engine through the catalyzed particulate filter according to claim 1.

11. The method according to claim 10, wherein the exhaust gas comprises unburned hydrocarbons, carbon monoxide, nitrogen oxides, and particulate matter.

12. The catalyzed particulate filter according to claim 1, wherein the mean pore size of the particulate filter is from 10 to 20 μm.

13. The catalyzed particulate filter according to claim 1, wherein:
the PGM in the second zone comprises at least one of platinum, palladium, or rhodium; and
the PGM in the first and third zone comprises at least two of platinum, palladium, or rhodium.

14. The catalyzed particulate filter according to claim 13, wherein:
the content of rhodium in the first zone is higher than the content of rhodium in the second zone, and the content of rhodium in the third zone is higher than the content of rhodium in the second zone, calculated as the weight of rhodium metal per zone volume.

* * * * *